United States Patent
Dairokuno et al.

(10) Patent No.: US 12,466,476 B2
(45) Date of Patent: Nov. 11, 2025

(54) VEHICLE LANE KEEP CONTROL APPARATUS

(71) Applicant: SUBARU CORPORATION, Tokyo (JP)

(72) Inventors: Shuhei Dairokuno, Tokyo (JP); Hiroaki Kuramochi, Tokyo (JP); Satoshi Nakano, Tokyo (JP); Masashi Okano, Tokyo (JP); Motohiro Hidaka, Tokyo (JP); Tatsuro Suzuki, Tokyo (JP); Katsuyuki Umezawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 432 days.

(21) Appl. No.: 18/182,008

(22) Filed: Mar. 10, 2023

(65) Prior Publication Data

US 2023/0311979 A1 Oct. 5, 2023

(30) Foreign Application Priority Data

Mar. 31, 2022 (JP) ................ 2022-059609

(51) Int. Cl.
| | | |
|---|---|---|
| *B62D 6/00* | (2006.01) | |
| *B60W 30/10* | (2006.01) | |
| *B60W 30/12* | (2020.01) | |
| *B62D 5/04* | (2006.01) | |
| *B62D 15/02* | (2006.01) | |
| *B60W 30/14* | (2006.01) | |

(52) U.S. Cl.
CPC ............ *B62D 6/003* (2013.01); *B60W 30/10* (2013.01); *B62D 5/046* (2013.01); *B62D 15/025* (2013.01); *B60W 30/12* (2013.01); *B60W 30/14* (2013.01); *B60W 30/143* (2013.01); *B60W 30/146* (2013.01)

(58) Field of Classification Search
CPC ...... B62D 6/003; B62D 5/046; B62D 15/025; B62D 6/001–6/10; B60W 30/10; B60W 30/12; B60W 30/14; B60W 30/143; B60W 30/146
See application file for complete search history.

(56) References Cited

U.S. PATENT DOCUMENTS

| | | | |
|---|---|---|---|
| 12,054,154 B2 * | 8/2024 | Goh | B60W 30/18172 |
| 2017/0183000 A1 * | 6/2017 | Yamakado | B60W 30/045 |
| 2017/0305421 A1 | 10/2017 | Sekizawa et al. | |
| 2022/0348227 A1 * | 11/2022 | Foster | B60Q 1/507 |

FOREIGN PATENT DOCUMENTS

JP 2016-88429 A 5/2016

* cited by examiner

*Primary Examiner* — Tinh Dang
(74) *Attorney, Agent, or Firm* — Rimon P.C.

(57) ABSTRACT

A vehicle lane keep control apparatus includes a steering control processor. the steering control processor is configured to, upon detection of a skid of a vehicle during control, switch modes from a lane keeping mode to a slip-handling mode, perform a steering control to allow the vehicle to have a stable attitude, and restart the lane keeping mode. The control includes setting a target route on which the vehicle is to travel, calculating a control amount for an electric power steering motor of the vehicle based on at least an amount of shifting from the target route, and causing the vehicle to travel along the target route.

6 Claims, 11 Drawing Sheets

VEHICLE LANE KEEP CONTROL APPARATUS

CROSS-REFERENCE TO RELATED APPLICATIONS

The present application claims priority from Japanese Patent Application No. 2022-059609 filed on Mar. 31, 2022, the entire contents of which are hereby incorporated by reference.

BACKGROUND

The disclosure relates to a vehicle lane keep control apparatus that allows a vehicle to travel along a target route.

In recent years, a vehicle lane keep control technique has been known as drive assistance. The vehicle lane keep control technique involves, for example, during travel of a vehicle, recognizing lane dividing lines of a road using a camera, controlling steering of the vehicle to keep a middle of a lane, and suppressing lane departure. For example, Japanese Unexamined Patent Application Publication (JP-A) No. 2016-88429 discloses a technique of a lane keep control system. The lane keep control system enables accurate detection of a road surface state of a road surface on which a vehicle travels or a road surface $\mu$ to perform more accurate lane keep control in accordance with the result of the detection.

SUMMARY

An aspect of the disclosure provides a vehicle lane keep control apparatus. The vehicle lane keep control apparatus includes a steering control processor. Upon detection of a skid of a vehicle during control, the steering control processor is configured to switch modes from a lane keeping mode to a slip-handling mode, perform a steering control to allow the vehicle to have a stable attitude, and restart the lane keeping mode. The control includes setting a target route on which the vehicle is to travel, calculating a control amount for an electric power steering motor of the vehicle based on at least an amount of shifting from the target route, and causing the vehicle to travel along the target route.

An aspect of the technology provides a vehicle lane keep control apparatus. The vehicle lane keep control apparatus includes circuitry. Upon detection of a skid of a vehicle during control, the circuitry is configured to switch modes from a lane keeping mode to a slip-handling mode, perform a steering control to allow the vehicle to have a stable attitude, and restart the lane keeping mode. The control includes setting a target route on which the vehicle is to travel, calculating a control amount for an electric power steering motor of the vehicle based on at least an amount of shifting from the target route, and causing the vehicle to travel along the target route.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
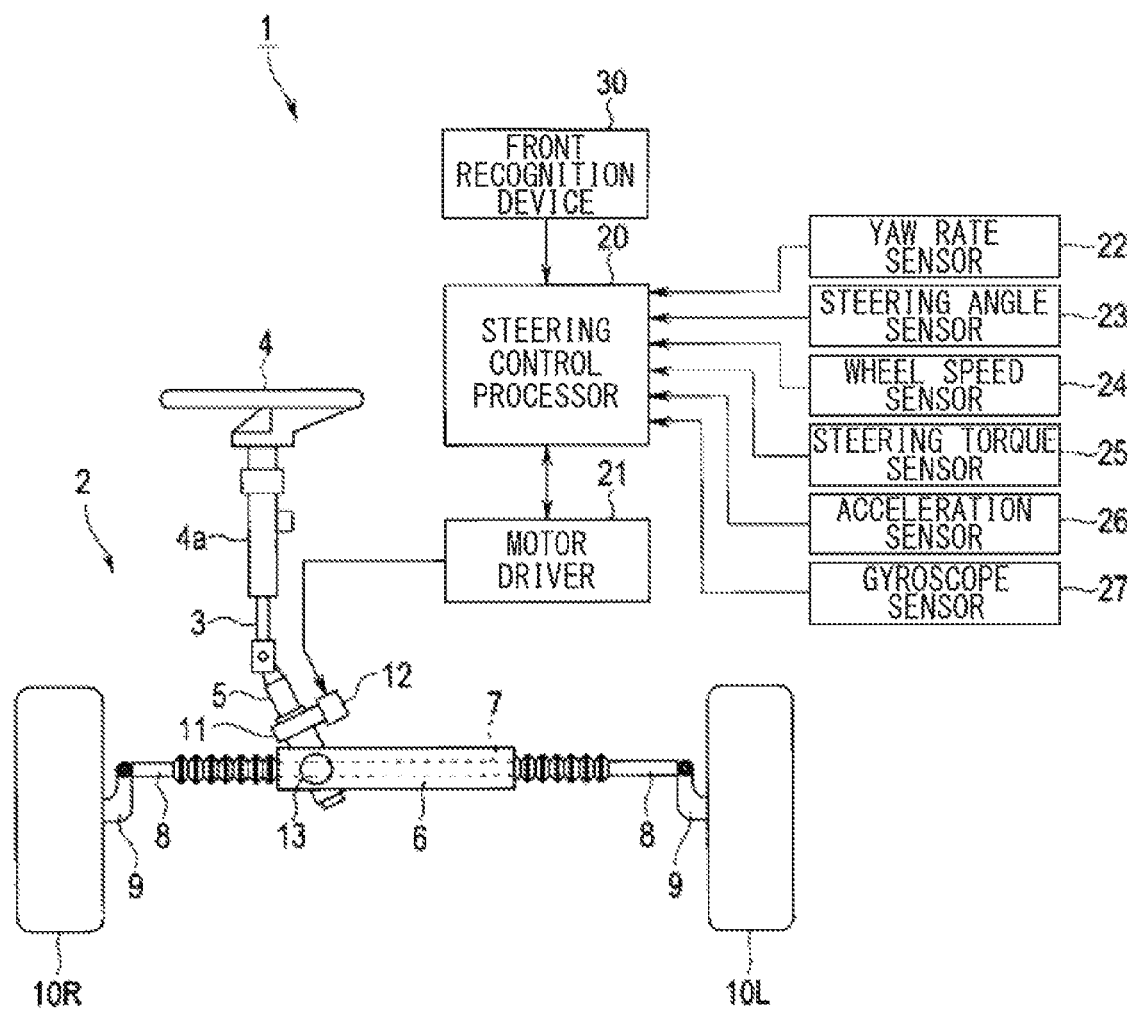
FIG. 1 is a schematic view of a configuration of a vehicle lane keep control apparatus which is a vehicle steering system.

According to a vehicle lane keep control apparatus such as an existing lane keep control system, when a vehicle slips, i.e., skids while traveling on a road having a low-$\mu$ road surface such as a snow road or a frozen road surface, the vehicle may depart from a lane-keeping regular route, resulting in a state of false steering. Therefore, when detecting that the vehicle is out of an operation design domain (ODD) upon suffering the slip state, the existing lane keep control apparatus automatically cancels the lane keep control and performs a control to hand the control over to a driver.

However, it is difficult for the existing lane keep control apparatus to restart the lane keep control until the vehicle travels stably after the cancel of the lane keep control. Therefore, after the vehicle slides due to a slip, for example, to cause the system to automatically cancel the lane keep control, the driver is to intervene to restart the lane keeping.

It is desirable to provide a vehicle lane keep control apparatus that makes it possible to restart a lane keep control in an early stage.

In the following, some example embodiments of the disclosure are described in detail with reference to the accompanying drawings. Note that the following description is directed to illustrative examples of the disclosure and not to be construed as limiting to the disclosure. In each of the drawings referred to in the following description, elements have different scales in order to illustrate the respective elements with sizes recognizable in the drawings. Factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the disclosure unless otherwise stated. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

As illustrated in FIG. 1, a vehicle lane keep control apparatus 1 may include an electric power steering system 2. In the electric power steering system 2, a steering angle may be configured to be freely set independently of a driver input.

In the lane keep control apparatus 1, a steering shaft 3 may be pivotably supported by an unillustrated vehicle body frame via a steering column 4a. One end of the steering shaft 3 may extend to a side of a driver's seat, and the other end thereof may extend to a side of an unillustrated engine room.

A steering wheel 4 may be disposed at the end of the steering shaft 3 extending to the side of the driver's seat. A pinion shaft 5 may be disposed at the end of the steering shaft 3 extending to the side of the engine room.

A steering gear box 6 extending in a vehicle width direction may be disposed in the unillustrated engine room. The steering gear box 6 may be provided with a rack shaft support mechanism 13. As for the rack shaft support mechanism 13, a rack shaft 7 may be inserted and supported in the steering gear box 6 to be freely reciprocated.

Right and left ends of the rack shaft 7 may project from respective ends of the steering gear box 6. A front knuckle 9 may be coupled to the end of the rack shaft 7 via a tie rod 8.

The front knuckle 9 may pivotably support right and left wheels 10R and 10L as steered wheels. In one embodiment, the right and left wheels 10R and 10L may serve as "wheels". The front knuckle 9 may be supported by the vehicle body frame to be freely steered.

When the steering wheel 4 is operated, the steering shaft 3 and the pinion shaft 5 may be rotated. The rotation of the pinion shaft 5 may cause the rack shaft 7 to move in a horizontal direction. The movement of the rack shaft 7 may cause the front knuckle 9 to pivot about an unillustrated king pin axis. This may allow the right and left wheels 10R and 10L to be steered in the horizontal direction.

The pinion shaft 5 may be provided with an assist transmission mechanism 11. The assist transmission mechanism 11 may be coupled to an electric power steering motor, i.e., an electric motor 12.

The electric motor 12 may assist a steering torque to be applied to the steering wheel 4 and may add a steering torque to allow for a set steering angle, i.e., a target steering angle. The electric motor 12 may be driven by a motor driver 21. At this time, a steering control processor 20 may output, to the motor driver 21, a target current as an output value to control driving of the electric motor 12.

The steering control processor 20 may be coupled to a front recognition device 30. The front recognition device 30 may recognize right and left lane dividing lines (such as white lines) in front as a shape of a traveling road, and may recognize the shape of the traveling road to allow for acquisition of lane dividing line positional information.

Figure 2:
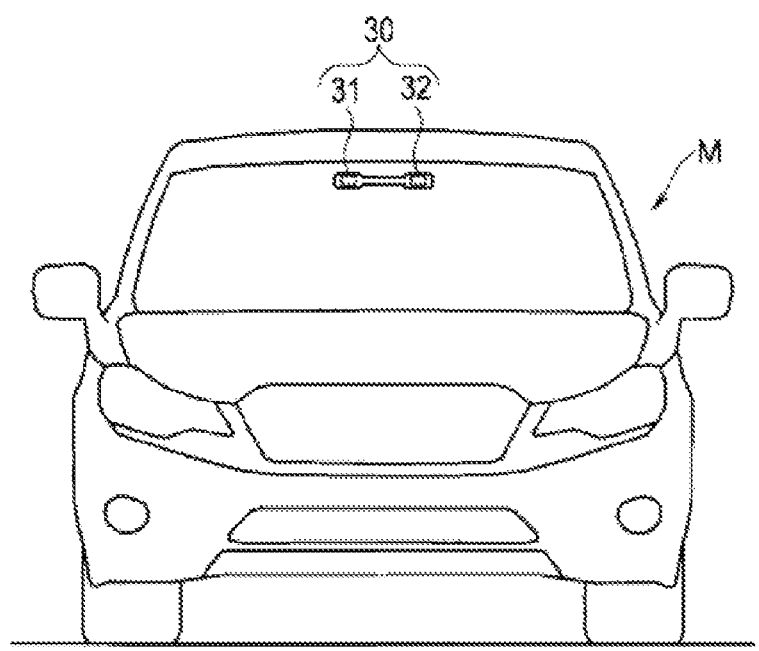
FIG. 2 is a front view of an own vehicle provided with a front recognition device.

The front recognition device 30 may include a pair of cameras 31 and 32 and an unillustrated stereo image processing unit. The pair of cameras 31 and 32 may each include an image sensor such as a CCD or a CMOS. The pair of cameras 31 and 32 may be fixed, for example, at a certain interval from each other at a front portion of a vehicle interior near a ceiling, as illustrated in FIG. 2.

The pair of cameras 31 and 32 may stereoscopically capture an image of an object outside the vehicle from different viewpoints. The unillustrated stereo image processing unit may then process two pieces of image data from the pair of cameras 31 and 32. In the processing of two pieces of image data from the pair of cameras 31 and 32 performed by the stereo image processing unit, distance information may be determined. The distance information may be determined from an amount of shifting between a stereoscopic image pair in a traveling direction of an own vehicle M being captured and a corresponding position. The stereo image processing unit may then generate a distance image.

The steering control processor 20 may receive inputs of various types of vehicle information from a yaw rate sensor 22, a steering angle sensor 23, a wheel speed sensor 24, a steering torque sensor 25, an acceleration sensor 26, and a gyroscope sensor 27, for example.

The yaw rate sensor 22 may detect a yaw rate acting on the own vehicle M. The steering angle sensor 23 may detect a steering angle of the steering wheel 4. The wheel speed sensor 24 may detect respective rotational speeds of a front-right wheel, a front-left wheel, a rear-right wheel, and a rear-left wheel of the own vehicle M, and may detect a traveling speed, i.e., a vehicle speed V. The steering torque sensor 25 may detect operational force of the steering wheel 4. The acceleration sensor 26 may detect forward acceleration, rearward acceleration, rightward acceleration, and leftward acceleration of the own vehicle M. The gyroscope sensor 27 may detect angular speed or angular acceleration of the own vehicle M.

Figure 3:
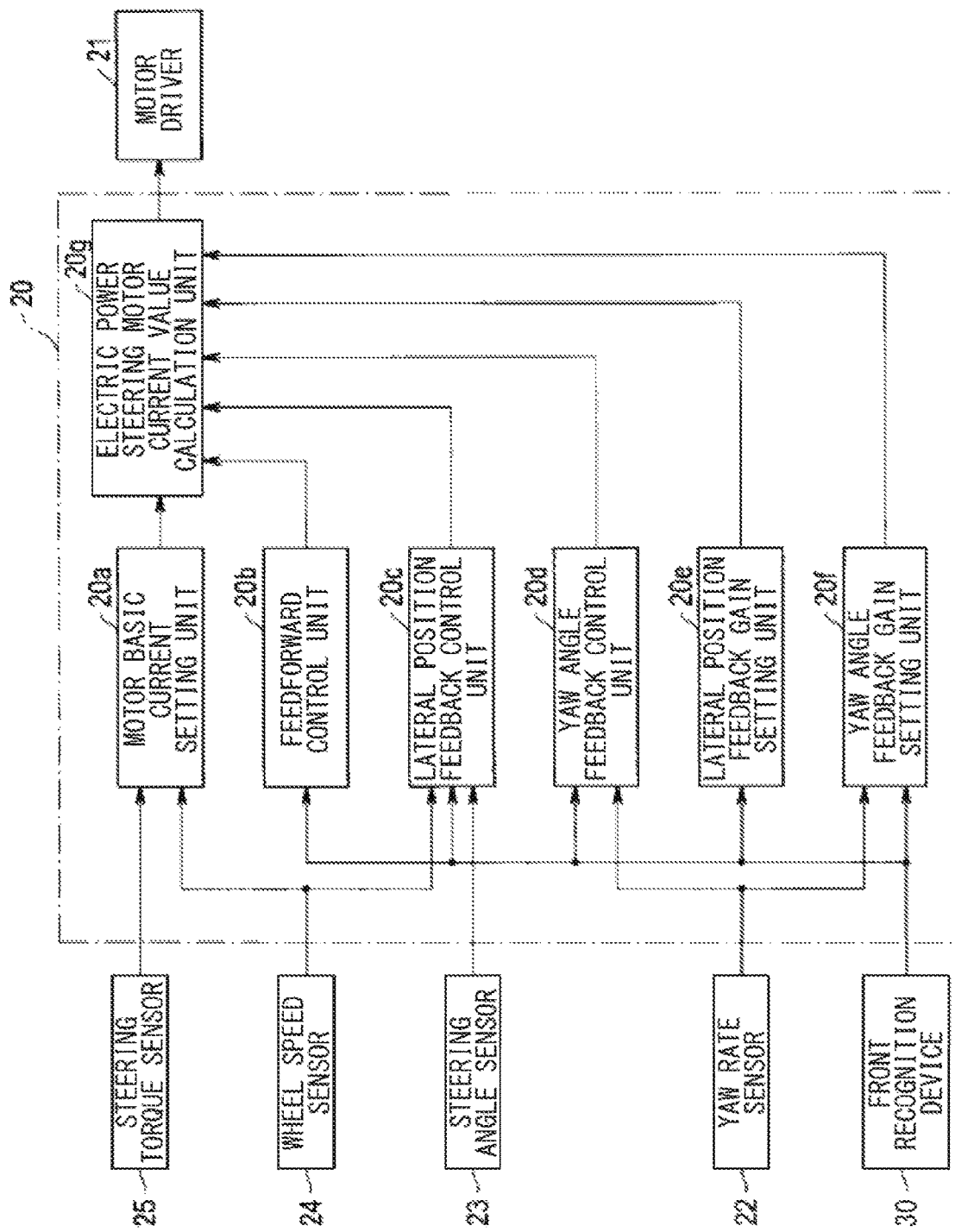
FIG. 3 is a functional block diagram of a steering control processor.

As illustrated in FIG. 3, the steering control processor 20 may mainly include a motor basic current setting unit 20a, a feedforward control unit 20b, a lateral position feedback control unit 20c, a yaw angle feedback control unit 20d, a lateral position feedback gain setting unit 20e, a yaw angle feedback gain setting unit 20f, and an electric power steering motor current value calculation unit 20g.

The lane keep control apparatus 1 may evaluate a change in luminance in a width direction of a road on the basis of knowledge that a lane dividing line has higher luminance than that of a road surface in recognizing data on the lane dividing line.

The lane keep control apparatus 1 may then identify, on an image plane, positions of right and left lane dividing lines in the image plane. The positions (x, y, z) of the lane dividing lines in a real space may be calculated from a known coordinate transformation equation on the basis of a position (i, j) on the image plane and parallax calculated in terms of the position, i.e., on the basis of distance information.

Figure 5:
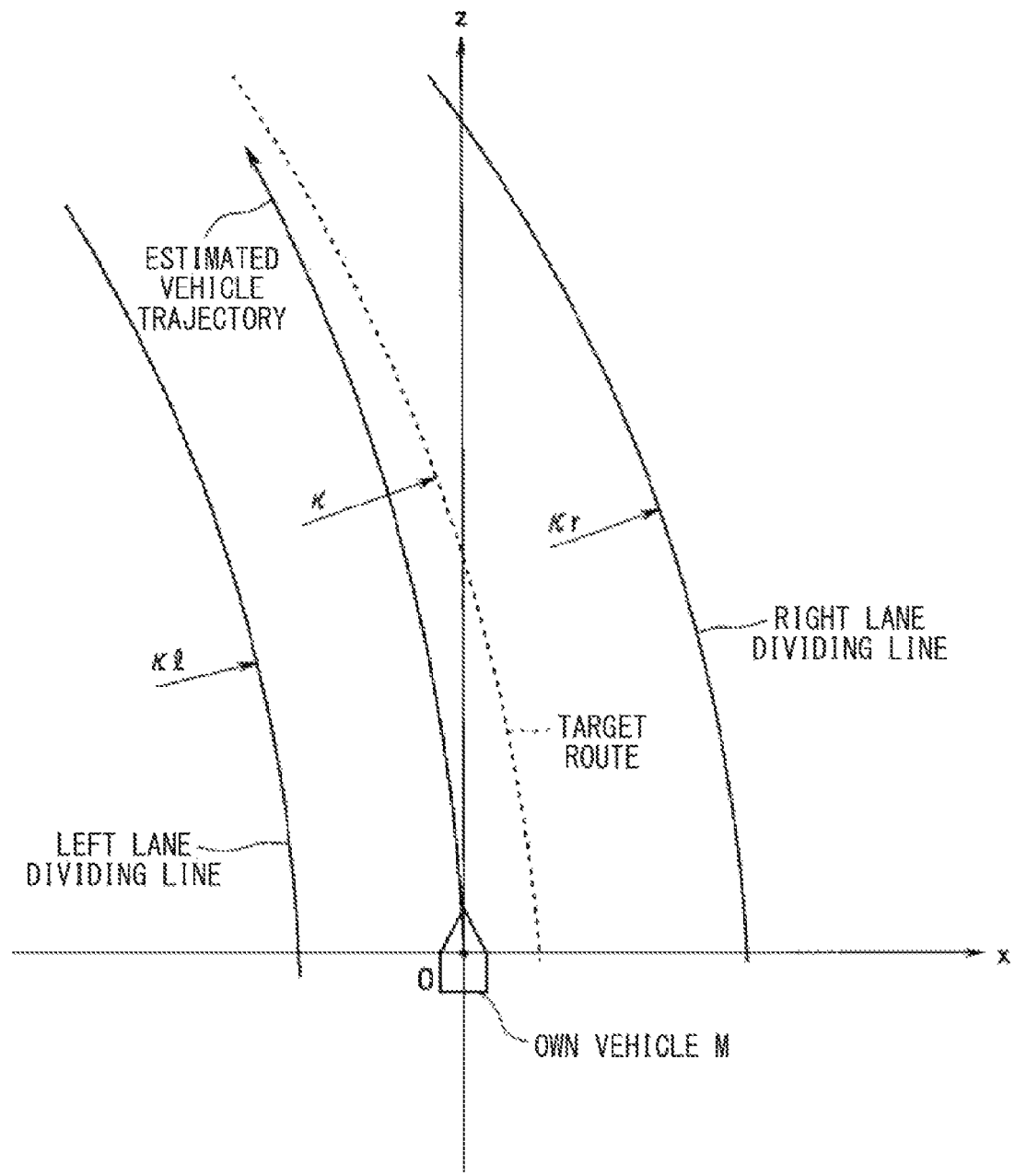
FIG. 5 is an explanatory diagram of feedforward control.

In the coordinate system of the real space which is set with reference to the position of the own vehicle M, for example, a vehicle width direction is set as an x-axis, a vehicle height direction is set as a y-axis, and a vehicle length direction, i.e., a distance direction is set as a z-axis, with a road surface immediately below the middle of the pair of cameras 31 and 32, which are stereo cameras, being set as the origin, as illustrated in FIG. 5.

At this time, an x-z plane (y=0) may coincide with the road surface in a case where the road is flat. A road model may be expressed by dividing a traveling lane of the own vehicle M on the road into a plurality of sections in the distance direction and by approximating and linking the right and left lane dividing lines in each of the sections in a predetermined manner.

The steering control processor 20 may set a motor basic current Ipsb in accordance with a steering torque Td set by a driver who drives the own vehicle M on the basis of each input signal.

The steering control processor 20 may calculate a feedforward control amount Iff of the electric motor 12 which is necessary to travel along a target route by feedforward control on the basis of a shape of a traveling road. In the example embodiment of the disclosure, the target route may be in the middle of the right lane dividing line and the left lane dividing line.

The steering control processor 20 may calculate a shift amount Δx in positions between a target route and an estimated vehicle trajectory in a front gazing point set in advance by estimating a vehicle trajectory of the own vehicle M.

The steering control processor 20 may perform control to reduce the shift amount Δx, and may calculate a lateral position feedback control amount Ifb to allow for traveling along the target route.

The steering control processor 20 may calculate a yaw angle feedback control amount Ifby to allow a yaw angle of the own vehicle M to be a yaw angle along the target route.

As for each control amount of the feedback controls, the steering control processor 20 may set a larger lateral position feedback gain of the lateral position feedback control amount Ifb in a case where a traveling road width Wr is wide, than in a case where the traveling road width Wr is narrow.

Meanwhile, the steering control processor 20 may set a larger yaw angle feedback gain of the yaw angle feedback control amount Ifby in a case where the traveling road width Wr is narrow, than in a case where the traveling road width Wr is wide.

The steering control processor 20 may calculate an electric motor current value Icmd by adding the values described above. On the basis of the calculation, the steering control processor 20 may output the electric motor current value Icmd to the motor driver 21 to control driving of the electric motor 12.

The motor basic current setting unit 20a may receive an input of the vehicle speed V from the wheel speed sensor 24. The motor basic current setting unit 20a may receive an input of the steering torque Td from the steering torque sensor 25.

Figure 4:
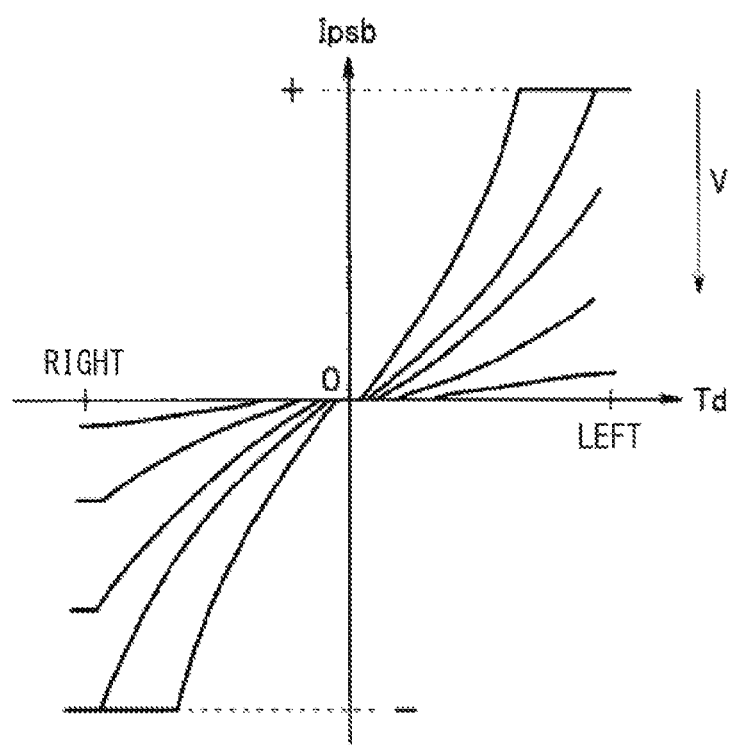
FIG. 4 is an explanatory diagram of an example of characteristics of an electric power steering motor steering torque versus an electric motor basic current value.

For example, the motor basic current setting unit 20a may set an electric motor basic current value Ipsb with reference to a characteristic map, which is set in advance, of the steering torque Td versus the electric motor basic current value Ipsb as illustrated in FIG. 4.

The motor basic current setting unit 20a may then output the electric motor basic current value Ipsb to the electric power steering motor current value calculation unit 20g.

The feedforward control unit 20b may receive an input of image information recognized by the front recognition device 30. The feedforward control unit 20b may then calculate the feedforward control amount (current value) Iff of the electric motor 12, which is necessary to travel along the target route, by the following expression (1), for example, and may output the calculated feedforward control amount (current value) Iff to the electric power steering motor current value calculation unit 20g.

$$Iff = Giff \cdot \kappa \quad (1)$$

Here, κ denotes a lane curvature as represented, for example, by the following expression (2).

$$\kappa = (\kappa l + \kappa r)/2 \quad (2)$$

In the expression (2), κl is a curvature component of the left lane dividing line, and κr is curvature component of the right lane dividing line.

In one example, the curvature components κr and κl the right and left lane dividing lines may be each determined by using a coefficient of a quadratic term calculated by a quadratic least squares method with respect to points constituting each of the right and left lane dividing lines as illustrated in FIG. 5.

For example, in a case where the lane dividing line is approximated by the quadratic expression: $x = A \cdot z^2 + B \cdot z + C$, a value of 2·A may be used as a curvature component. Note that the curvature components κr and κl of these lane dividing lines may be curvatures per se of the respective lane dividing lines.

Giff in the expression (1) denotes a feedforward gain set in advance by an experiment or an operation, for example. In this manner, the feedforward control unit 20b may be provided as a feedforward controller.

The lateral position feedback control unit 20c may receive an input of image information recognized by the front recognition device 30. In addition, the lateral position feedback control unit 20c may receive an input of the vehicle speed V from the wheel speed sensor 24. Further, the lateral position feedback control unit 20c may receive an input of a steering angle θp from the steering angle sensor 23.

The lateral position feedback control unit 20c may then calculate the lateral position feedback control amount (current value) Ifb by the following expression (3). The lateral position feedback control unit 20c may output the lateral position feedback control amount Ifb to the electric power steering motor current value calculation unit 20g.

$$Ifb = Gifb \cdot \Delta x \quad (3)$$

Figure 6:
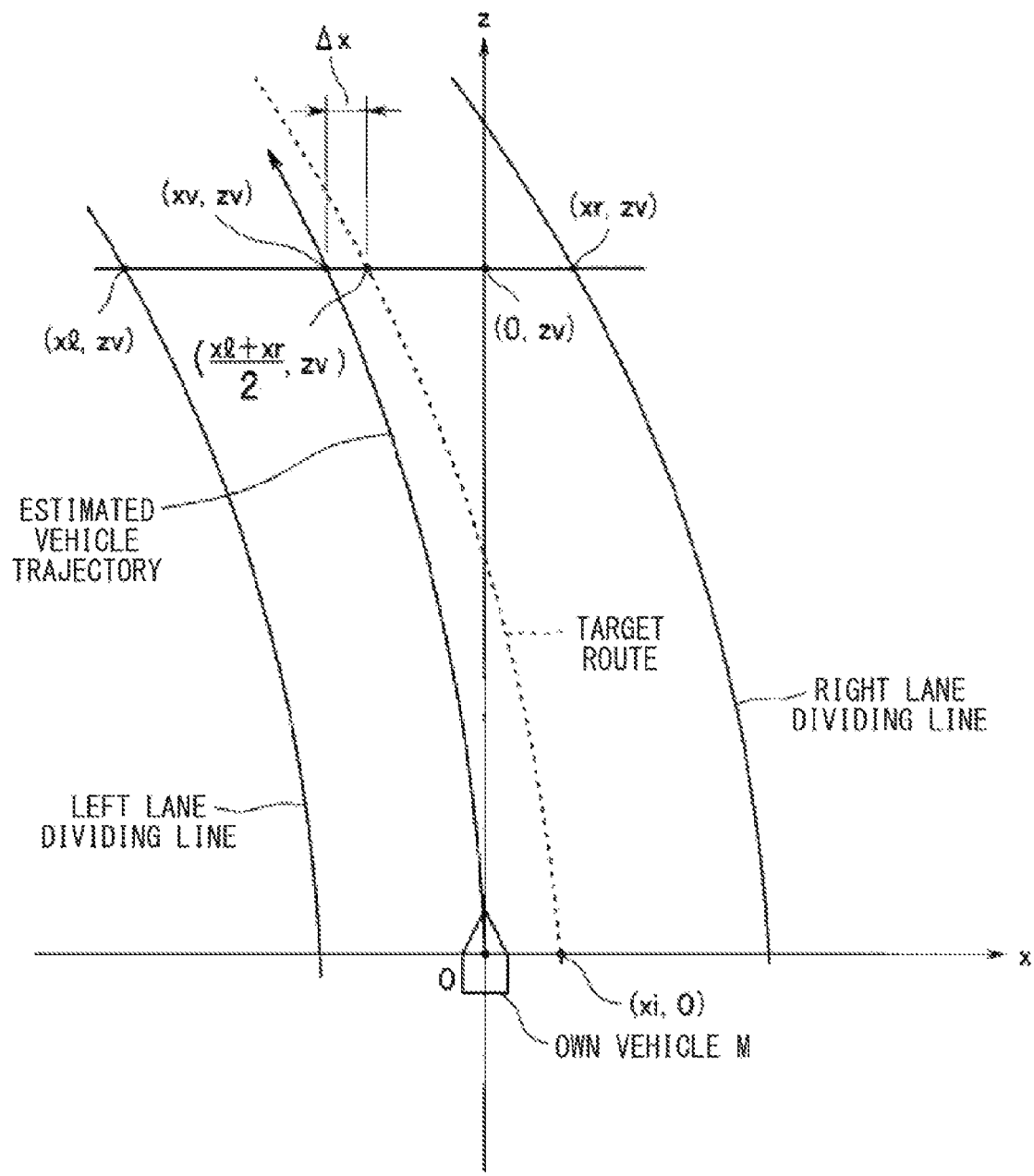
FIG. 6 is an explanatory diagram of lateral position feedback control.

Here, Gifb is a gain set in advance by an experiment or an operation, for example. As illustrated in FIG. 6, Δx may be calculated by the following expression (4).

$$\Delta x = (xl + xr)/2 - xv \quad (4)$$

In the expression (4), xv is an x-coordinate of an estimated vehicle trajectory in a z-coordinate of a front gazing point (0, zv) of the own vehicle M, and zv, which is a front gaze distance (z-coordinate) of the front gazing point (0, zv), is calculated by the expression: $zv = T \cdot V$ in the example embodiment of the disclosure. Here, T is a predicted time set in advance, and is set to 1.2 seconds, for example.

Accordingly, in a case of using specifications of the own vehicle M or a stability factor As specific to the vehicle, for example, on the basis of a traveling state of the own vehicle M, xv may be calculated by the following expression (5).

$$xv = (1/2) \cdot (1/(1 + As \cdot V^2)) \cdot (\theta p / Lw) \cdot (T \cdot V)^2 \quad (5)$$

Here, Lw is a wheelbase. In addition, in the expression (4), xl is an x-coordinate of the left lane dividing line in the z-coordinate of the front gazing point (0, zv), and xr is an x-coordinate of the right lane dividing line in the z-coordinate of the front gazing point (0, zv).

Note that xv described above may also be calculated by the following expression (6) using the vehicle speed V and a yaw rate (dθ/dt). Alternatively, xv described above may also be calculated by the following expression (7) on the basis of image information.

$$xv = (1/2) \cdot ((d\theta/dt)/V) \cdot (V \cdot T)^2 \quad (6)$$

$$xv = (1/2) \cdot \kappa \cdot (V \cdot T)^2 \quad (7)$$

In this manner, the lateral position feedback control unit 20c may be provided as a lateral position feedback controller. The yaw angle feedback control unit 20d may receive an input of image information recognized by the front recognition device 30.

The lateral position feedback control unit 20c may then calculate the yaw angle feedback control amount (current value) Ifby to allow for feedback control of the yaw angle of the own vehicle M to be a yaw angle along the target route, for example, by the following expression (8). The lateral position feedback control unit 20c may then output the yaw angle feedback control amount (current value) Ifby to the electric power steering motor current value calculation unit 20g.

$$Ifby = Gifby \cdot (\theta tl + \theta tr)/2 \qquad (8)$$

Figure 7:
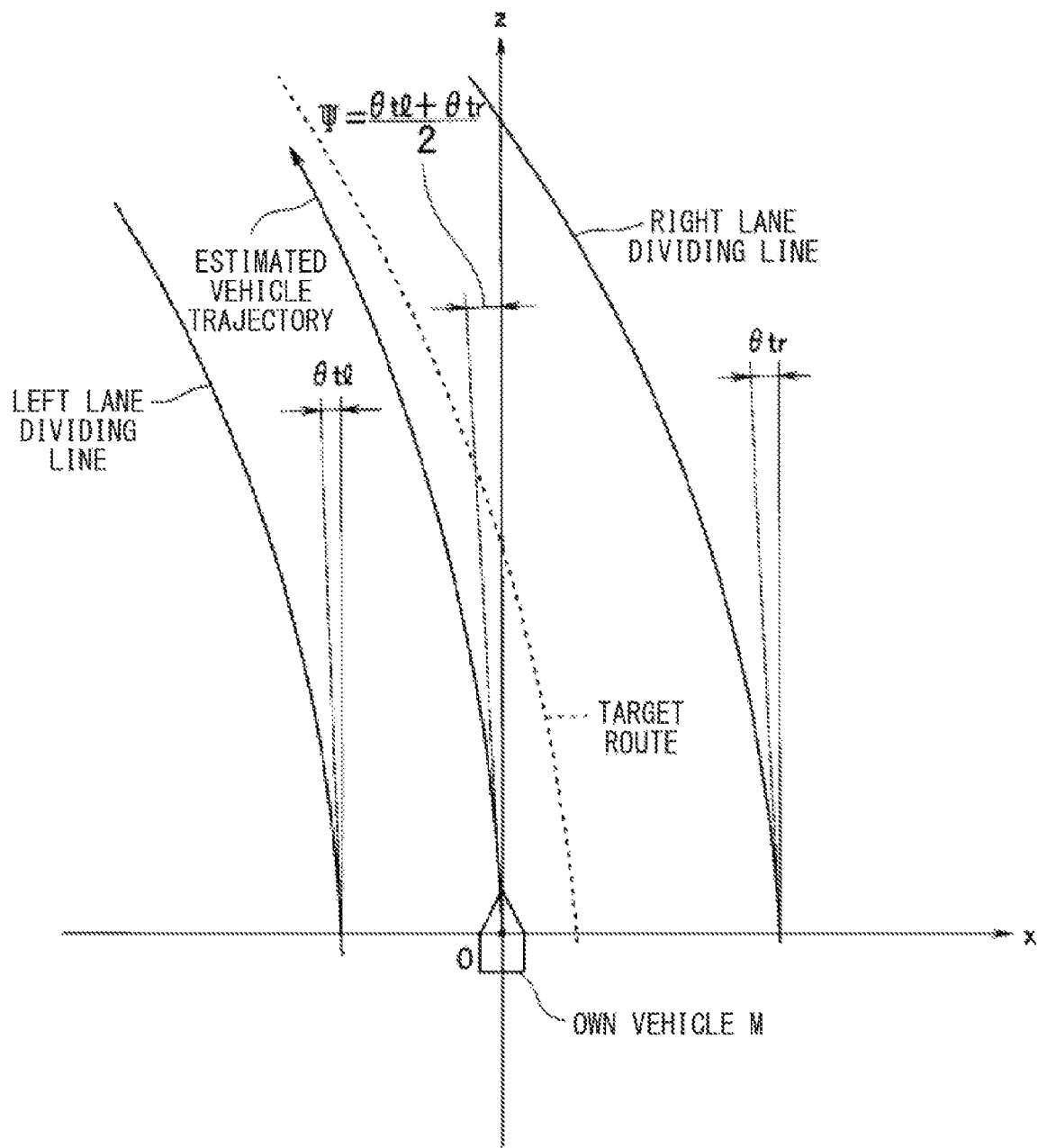
FIG. 7 is an explanatory diagram of yaw angle feedback control.

Here, Gifby is a gain set in advance by an experiment or an operation, for example. $\theta tl$ is a slope of the own vehicle M relative to the left lane dividing line obtained by image information from the front recognition device 30. $\theta tr$ is a slope of the own vehicle M relative to the right lane dividing line obtained by image information from the front recognition device 30, as illustrated in FIG. 7. Note that a relative-to-lane yaw angle $\Psi$ may be calculated by the expression: $\Psi = (\theta tl + \theta tr)/2$.

As for these values $\theta tl$ and $\theta tr$, for example, a coefficient of a linear term calculated by a quadratic least square method may be used for each point of the lane dividing line obtained by the image information. The coefficient of the linear term is a value of B in the expression: $x = A \cdot z^2 + B \cdot z + C$ for the approximation of the lane dividing line.

In this manner, the yaw angle feedback control unit 20d may be provided as a yaw angle feedback controller. Note that the yaw angle of the own vehicle M may be detected on the basis of a change in the yaw angle inputted from the yaw rate sensor 22.

The lateral position feedback gain setting unit 20e may receive an input of image information recognized by the front recognition device 30. The lateral position feedback gain setting unit 20e may then determine the traveling road width Wr on the basis of image information, for example, from an interval between the left lane dividing line and the right lane dividing line, and may compare the traveling road width Wr with a reference width C set in advance.

In a case where determination is made, as a result of the comparison, that the traveling road width Wr is wider than the reference width C (Wr>C) and that the traveling road width Wr of the traveling road is wide as in an expressway, the lateral position feedback gain setting unit 20e may set a lateral position feedback gain Gfb1. The lateral position feedback gain Gfb1 has a large value as a lateral position feedback gain Gfb to be multiplied by the lateral position feedback control amount Ifb.

Conversely, in a case where determination is made that the traveling road width Wr is equal to or less than the reference width C (Wr≤C) and that the traveling road width Wr of the traveling road is narrow as in a general road, the lateral position feedback gain setting unit 20e may set a lateral position feedback gain Gfb2. The lateral position feedback gain Gfb2 has a small value as the lateral position feedback gain Gfb to be multiplied by the lateral position feedback control amount Ifb.

That is, in a case where Gfb1>Gfb2 holds true and the traveling road width Wr is wide, the degree of influence of the lateral position feedback control amount Ifb may be set stronger than in the case where the traveling road width Wr is narrow. The lateral position feedback gain Gfb thus set may be outputted to the electric power steering motor current value calculation unit 20g. In this manner, the lateral position feedback gain setting unit 20e may be provided as a lateral position feedback gain setter.

The yaw angle feedback gain setting unit 20f may receive an input of image information recognized by the front recognition device 30. The yaw angle feedback gain setting unit 20f may then determine, on the basis of the image information, the traveling road width Wr from the interval between the left lane dividing line and the right lane dividing line, for example, and may compare the traveling road width Wr with the reference width C set in advance.

In a case where determination is made, as a result of the comparison, that the traveling road width Wr is wider than the reference width C (Wr>C) and that the traveling road width Wr of the traveling road is wide as in an expressway, the yaw angle feedback gain setting unit 20f may set a yaw angle feedback gain Gfby1. The yaw angle feedback gain Gfby1 has a small value as a yaw angle feedback gain Gfby to be multiplied by the yaw angle feedback control amount Ifby.

Conversely, in a case where determination is made that the traveling road width Wr is equal to or less than the reference width C (Wr≤C) and that the traveling road width Wr of the traveling road is narrow as in a general road, the yaw angle feedback gain setting unit 20f may set a yaw angle feedback gain Gfby2. The yaw angle feedback gain Gfby2 has a large value as the yaw angle feedback gain Gfby to be multiplied by the yaw angle feedback control amount Ifby.

That is, in a case where Gfby1<Gfby2 holds true and the traveling road width Wr is narrow, the degree of influence of the yaw angle feedback control amount Ifby may be set stronger than in the case where the traveling road width Wr is wide. The yaw angle feedback gain Gfby thus set may be outputted to the electric power steering motor current value calculation unit 20g. In this manner, the yaw angle feedback gain setting unit 20f may be provided as a yaw angle feedback gain setter.

The electric power steering motor current value calculation unit 20g may receive an input of the electric motor basic current value Ipsb from the motor basic current setting unit 20a. The electric power steering motor current value calculation unit 20g may receive an input of the feedforward control amount Iff from the feedforward control unit 20b.

The electric power steering motor current value calculation unit 20g may receive an input of the lateral position feedback control amount Ifb from the lateral position feedback control unit 20c. The electric power steering motor current value calculation unit 20g may receive an input of the yaw angle feedback control amount Ifby from the yaw angle feedback control unit 20d.

The electric power steering motor current value calculation unit 20g may receive an input of the lateral position feedback gain Gfb from the lateral position feedback gain setting unit 20e. The electric power steering motor current value calculation unit 20g may receive an input of the yaw angle feedback gain Gfby from the yaw angle feedback gain setting unit 20f.

The electric power steering motor current value calculation unit 20g may then calculate the electric motor current value Icmd, for example, by the following expression (9), and may output the calculated electric motor current value Icmd to the motor driver 21 to control driving of the electric motor 12.

$$Icmd = Ipsb + Iff + Gfb \cdot Ifb + Gfby \cdot Ifby \qquad (9)$$

The steering control processor 20 of the lane keep control apparatus 1 configured as described above may execute the lane keep control of the own vehicle M.

That is, the steering control processor 20 may detect, as traveling lane information, information on a traveling lane on which the own vehicle M travels and positional information on the own vehicle M relative to the traveling lane, from information on the right and left lane dividing lines detected by the front recognition device 30. Examples of the information on the traveling lane may include positions and curvatures of the right and left lane dividing lines. Examples of the positional information on the own vehicle M may include distances to the right and left lane dividing lines, a traveling road width, and an attitude angle of a vehicle relative to the traveling lane, i.e., a relative-to-lane yaw angle.

On the basis of the traveling lane information, the lane keep control such as a lane keep centering control or a lane departure prevention control may be performed for the own vehicle M. Note that the example of the lane keep control of the steering control processor 20 is well known, and thus detailed description of the control example is omitted.

Figure 8:
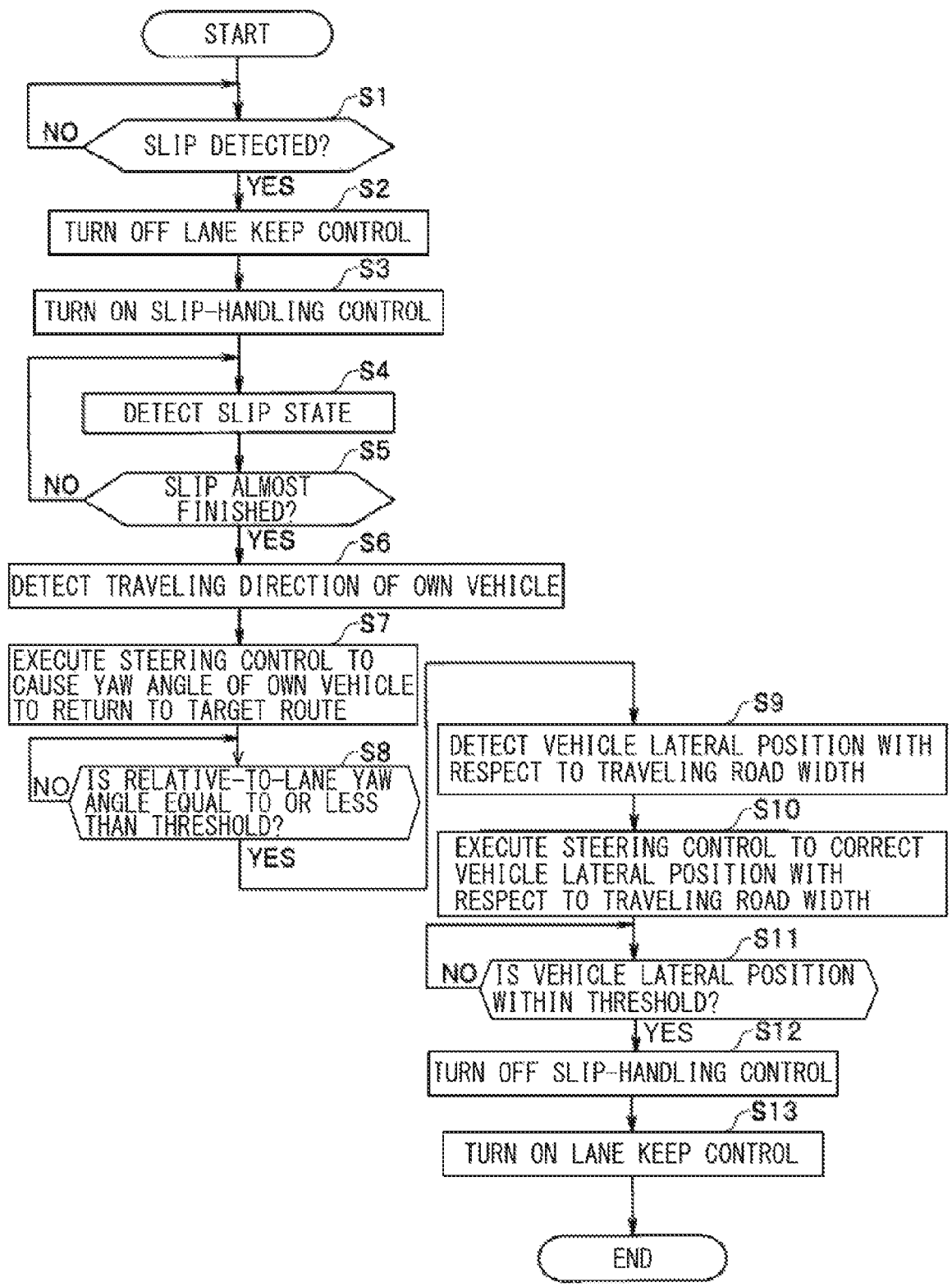
FIG. 8 is a flowchart illustrating an example of a control during a slip-handling mode.

Here, in the vehicle lane keep control apparatus 1 according to the example embodiment of the disclosure, in a case where the own vehicle M slips, i.e., skids during the lane keep control, the steering control processor 20 may execute the control in the flowchart exemplified in FIG. 8.

The steering control processor 20 of the lane keep control apparatus 1 may detect whether the own vehicle M is slipping, i.e., skidding (Step S1). At this time, the steering control processor 20 may determine whether the own vehicle M is slipping away from the target route on the basis of several factors. Examples of the several factors may include the yaw rate inputted from the yaw rate sensor 22, the steering angle θp inputted from the steering angle sensor 23, the vehicle speed V inputted from the wheel speed sensor 24, the forward acceleration, rearward acceleration, rightward acceleration, and leftward acceleration inputted from the acceleration sensor 26, and the yaw rate inputted from the gyroscope sensor 27.

Figure 9:
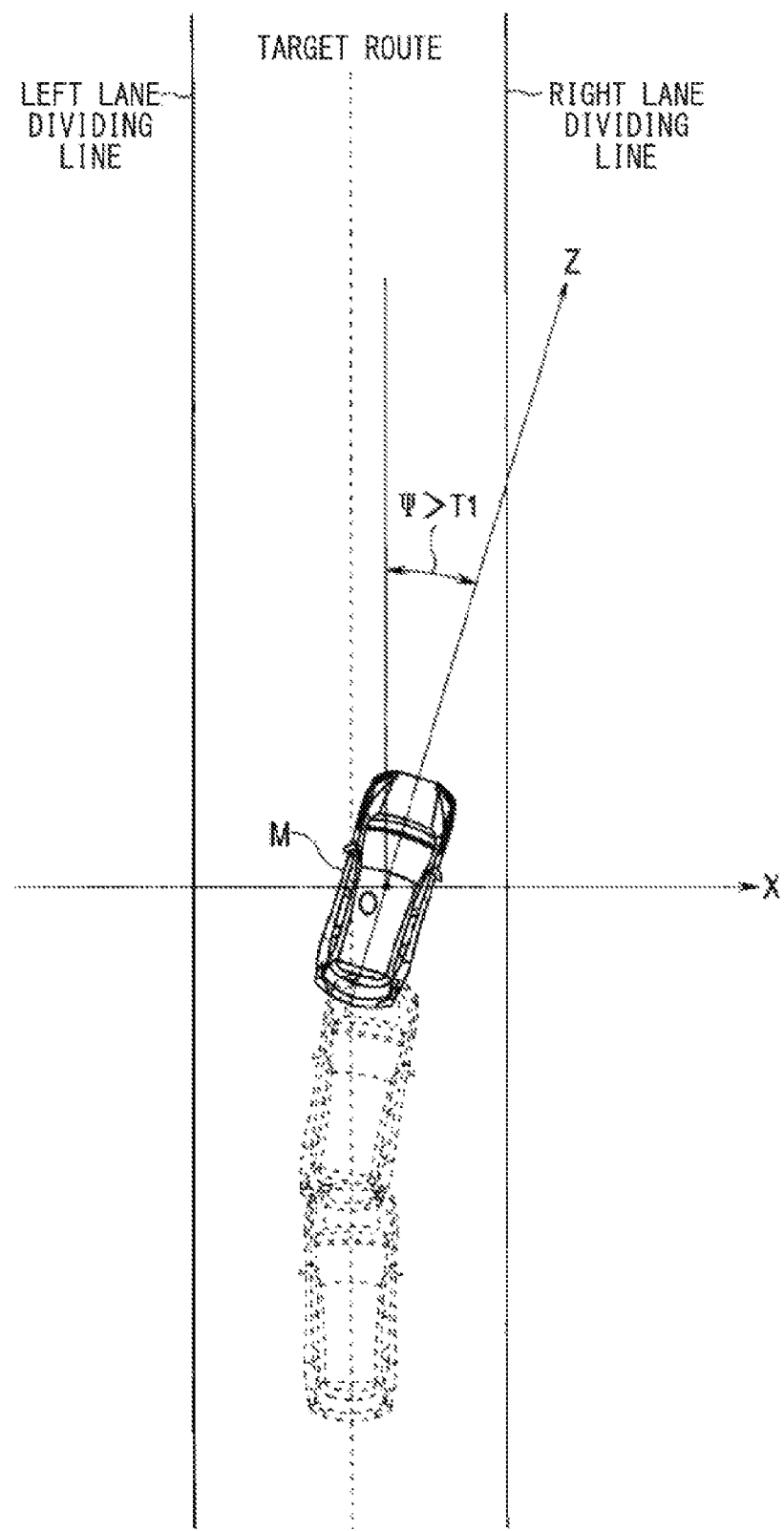
FIG. 9 is a diagram illustrating a state where an own vehicle is slipped when traveling a traveling lane of a straight road.

In one example, in a case where the relative-to-lane yaw angle $\Psi\{=(\theta tl+\theta tr)/2\}$ becomes larger than a predetermined threshold (first threshold) T1, for example, as illustrated in FIG. 9, the steering control processor 20 may determine that the own vehicle M is slipping. In one embodiment, the predetermined threshold T1 may serve as a "first threshold". Note that FIG. 9 exemplifies a state where the own vehicle M is slipped when traveling on a traveling lane of a straight road.

In addition, for example, in a case where values such as the acceleration inputted from the acceleration sensor 26 and the angular acceleration inputted from the gyroscope sensor 27 greatly differ from values calculated from the steering angle θp inputted from the steering angle sensor 23 and the wheel speed, i.e., the vehicle speed V inputted from the wheel speed sensor 24, the steering control processor 20 may determine that the own vehicle M is slipping.

Further, for example, in a case where the value of the yaw rate inputted from the yaw rate sensor 22 greatly differs from the values calculated from the steering angle θp and the wheel speed, i.e., the vehicle speed V, the steering control processor 20 may determine that the own vehicle M is slipping.

Note that, in a case where one of the left or right lane dividing line is not detected from the image information recognized by the front recognition device 30 and the own vehicle M moves toward the detected lane dividing line in the traveling direction, for example, the steering control processor 20 may determine that the own vehicle M is slipping.

The steering control processor 20 may then repeatedly detect the slip of the own vehicle M during the lane keep control. In a case of detecting the slip of the own vehicle M (Step S1: YES), the steering control processor 20 may finish, i.e., turn OFF the lane keep control (Step S2).

Thereafter, the steering control processor 20 may start, i.e., turn ON a slip-handling control (Step S3). That is, the steering control processor 20 may shift controls from the lane keep control in a lane keeping mode to the slip-handling control being a slip-handling mode to execute the slip-handling control.

In the slip-handling control, the steering control processor 20 may detect a slip state of the own vehicle M (Step S4). At this time, the steering control processor 20 may detect the slip state from a behavior of the own vehicle M in the traveling direction with respect to the vehicle speed V and the steering angle θp. At this time, the steering control processor 20 may detect the slip state of the own vehicle M, for example, from the values such as the relative-to-lane yaw angle Ψ, the steering angle θp, the wheel speed, i.e., the vehicle speed V, the forward acceleration and rearward acceleration, the angular acceleration, or the yaw rate.

The steering control processor 20 may then determine whether the slip of the own vehicle M is almost finished (Step S5). For example, the steering control processor 20 may detect whether the slip of the own vehicle M is almost finished by a reduction in the relative-to-lane yaw angle Ψ as well as reductions in differences between values calculated from the vehicle speed V and the steering angle θp and values such as the acceleration, the angular acceleration, and the yaw rate.

In a case where the slip of the own vehicle M is not almost finished (Step S5: NO), the steering control processor 20 may return to the detection of the slip state of the own vehicle M in Step S4, and may repeatedly execute the determination routine in Step S5.

In a case where the slip of the own vehicle M is almost finished (Step S5: YES), the steering control processor 20 may detect the traveling direction of the own vehicle M (Step S6). The steering control processor 20 may detect, for example, a z-axis direction which is a vehicle length direction of the own vehicle M relative to the traveling lane determined from the right and left lane dividing lines. That is, the steering control processor 20 may detect an attitude of the own vehicle M relative to the traveling lane in a front-rear direction which is the traveling direction of the own vehicle M.

The steering control processor 20 may then execute a steering control to allow the yaw angle of the own vehicle M to return to the target route (Step S7). The steering control processor 20 may control driving of the motor driver 21 to cause the electric motor 12 to assist a steering torque to be applied to the steering wheel 4. That is, the steering control processor 20 may perform control to allow for a steering angle (target steering angle) θp to cause the own vehicle M to return in a direction of the target route.

Figure 10:
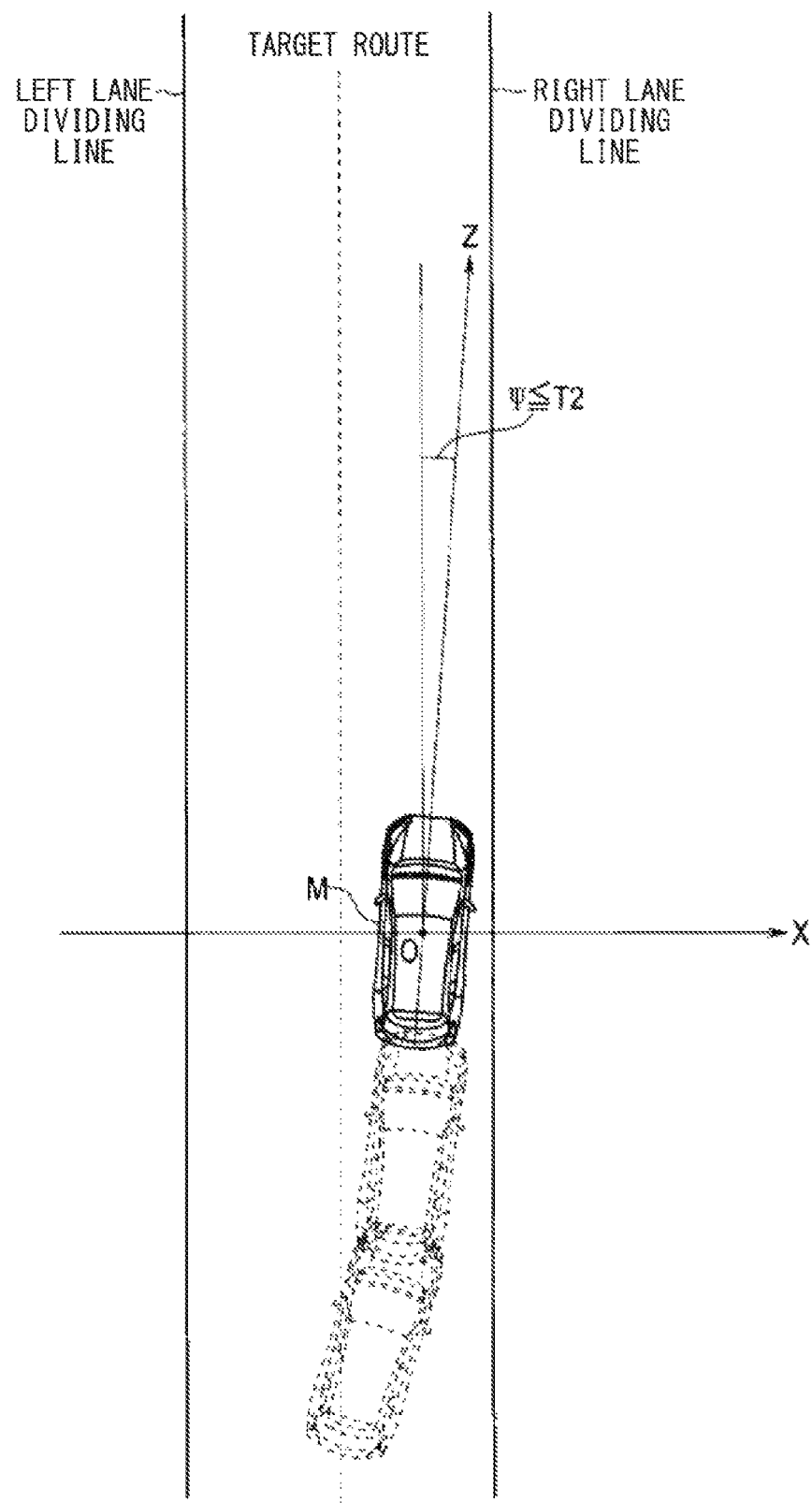
FIG. 10 is a diagram illustrating a state where an attitude of a slipped own vehicle relative to a traveling lane is corrected by a steering control during the slip-handling mode.

Thereafter, the steering control processor 20 may determine whether the relative-to-lane yaw angle Ψ is equal to or less than a predetermined threshold (second threshold) T2 (Step S8). In one embodiment, the predetermined threshold T2 may serve as a "second threshold". Note that the predetermined threshold T2 is a value smaller than the predetermined threshold (first threshold) T1. For example, as illustrated in FIG. 10, the steering control processor 20 may correct, i.e., turn the attitude of the own vehicle M, by steering, relative to the traveling lane in the front-rear direction which is the traveling direction of the own vehicle M.

The steering control processor 20 may then repeatedly execute the determination routine in Step S8 until the relative-to-lane yaw angle $\Psi$ is equal to or less than the predetermined threshold T2. Note that the predetermined threshold T2 may be set to the relative-to-lane yaw angle $\Psi$ that allows for correction of a direction to a range in which the own vehicle M is able to change the attitude without causing a slip away from the target route of the traveling lane. Note that Step S8 may be, for example, a routine to determine whether both of the right and left lane dividing lines are detected from the image information recognized by the front recognition device 30.

In a case where the relative-to-lane yaw angle $\Psi$ of the own vehicle M is equal to or less than the predetermined threshold T2 (Step S8: YES), the steering control processor 20 may detect a lateral position of the own vehicle M with respect to the traveling road width Wr (Step S9). The steering control processor 20 may detect the lateral position of the own vehicle M with respect to the traveling road width Wr determined from the interval between the left lane dividing line and the right lane dividing line from the image information recognized by the front recognition device 30.

Figure 11:
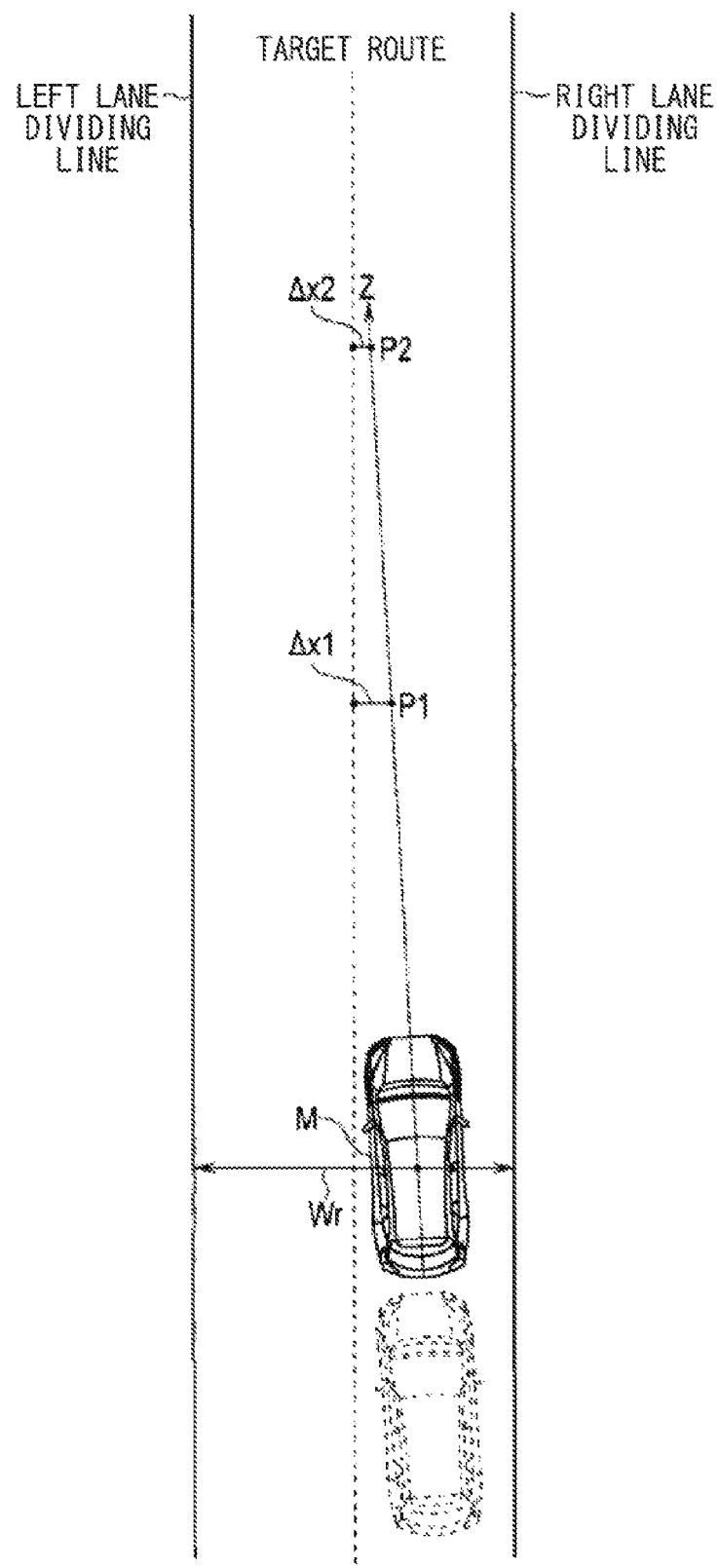
FIG. 11 is a diagram illustrating a state where an own vehicle is controlled in terms of steering on a basis of an amount of shifting between a target route and a vehicle trajectory estimated using a front gazing point.

The steering control processor 20 may then execute a steering control to correct the lateral position of the own vehicle M with respect to the traveling road width Wr (Step S10). At this time, as illustrated in FIG. 11, the steering control processor 20 may execute a steering control based on a shift amount $\Delta x2$ between the target route and a vehicle trajectory estimated using a second front gazing point P2 on the z-axis. The second front gazing point P2 on the z-axis is located more distant in the traveling direction than a first front gazing point P1 on the z-axis which indicates the vehicle length direction of the own vehicle M during the lane keep control.

That is, the steering control processor 20 may perform a steering control to gradually return the lateral position of the own vehicle M toward the target route, because the shift amount $\Delta x2$ is smaller than a shift amount $\Delta x1$ between the target route and a vehicle trajectory estimated using the first front gazing point P1 during the lane keep control.

The steering control processor 20 may then determine whether the lateral position of the own vehicle M with respect to the traveling road width Wr is within a predetermined threshold (Step S11). As for this third threshold (third threshold), a lateral position of the own vehicle M may be set that does not require an acute steering angle even when the lane keep control of the own vehicle M is restarted. On the basis of the image information recognized by the front recognition device 30, the steering control processor 20 may repeatedly execute the determination routine in Step S5 until the lateral position of the own vehicle M falls within a predetermined threshold.

In a case where the lateral position of the own vehicle M falls within the predetermined threshold (Step S11: YES), the steering control processor 20 may finish, i.e., turn OFF the slip-handling control (Step S12). The steering control processor 20 may then start, i.e., turn ON the lane keep control (Step S13), and may finish the present control. That is, the steering control processor 20 may shift controls from the slip-handling control being the slip-handling mode to the lane keep control in the lane-keep mode to execute the lane keep control.

As described above, in a case of detecting a slip, i.e., a skid of the own vehicle M during execution of the lane keeping, the vehicle lane keep control apparatus 1 according to the example embodiment of the disclosure may temporarily cancel the lane keep control, switch the lane keep control to the slip-handling mode, i.e., the slip-handling control, return the own vehicle M to a stable attitude, and execute the lane keep control again.

In addition, the vehicle lane keep control apparatus 1 may gradually return the own vehicle M to the target route in the middle of the lane to allow the own vehicle M not to deviate out of the lane in a stepwise manner during the execution of the slip-handling mode. The vehicle lane keep control apparatus 1 may then return the own vehicle M to a stable traveling attitude to restart the lane keep control in an early stage.

The description has been given in the foregoing example embodiment of the disclosure by referring to the example in which the shape of the traveling road is recognized on the basis of images from the pair of cameras 31 and 32. However, the shape of the traveling road may also be determined on the basis of image information from a monocular camera or a color camera, for example. Further, a configuration may also be adopted in which a steering control is executed on the basis of a detected value of the position of an own vehicle using a GPS installed in the vehicle.

Note that the steering control processor 20 of the lane keep control apparatus 1 may include a processor including a memory such as a central processing unit (CPU), a read-only memory (ROM), or a random-access memory (RAM). Some or all of the circuits of the processor may be implemented by software. For example, various programs corresponding to various functions stored in the ROM may be read and implemented by the CPU.

Further, all or a part of functions of the processor may be achieved by a logic circuit or an analog circuit, and processes based on various programs may be achieved by an electronic circuit such as field programmable gate array (FPGA).

The disclosure described above is not limited to the foregoing example embodiments, and various modifications may be made in the implementation stage without departing from the gist of the disclosure. Further, the foregoing example embodiments each include various stages of the disclosure, and various disclosures may be extracted by appropriately combining the features of the disclosure disclosed herein.

For example, in a case where the above-described concerns may be addressed and the above-described effects may be obtained even if some features are deleted from all the features disclosed in the foregoing example embodiments, the remaining features may be extracted as one embodiment of the disclosure.

According to an example embodiment of the disclosure, it is possible to restart a lane keep control in an early stage without intervention of a driver after automatic cancellation of the lane keep control upon detection of a slip of a vehicle.

The steering control processor 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the steering control processor 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the steering control processor 20 illustrated in FIG. 1.

The invention claimed is:

1. A vehicle lane keep control apparatus comprising a steering control processor configured to, upon detection of a skid of a vehicle during control that includes setting a target route on which the vehicle is to travel, calculating a control amount for an electric power steering motor of the vehicle based on at least an amount of shifting from the target route, and causing the vehicle to travel along the target route, switch modes from a lane keeping mode to a slip-handling mode, perform a steering control to allow the vehicle to have a stable attitude, and restart the lane keeping mode.

2. The vehicle lane keep control apparatus according to claim 1, further comprising:
 a motor driver configured to drive the electric power steering motor;
 a yaw rate sensor configured to detect a yaw rate acting on the vehicle;
 a steering angle sensor configured to detect a steering angle of a steering wheel of the vehicle;
 a wheel speed sensor configured to detect a rotational speed of each of a front-right wheel, a front-left wheel, a rear-right wheel, and a rear-left wheel of the vehicle;
 an acceleration sensor configured to detect forward acceleration, rearward acceleration, rightward acceleration, and leftward acceleration of the vehicle;
 a gyroscope sensor configured to detect an angular speed or angular acceleration of the vehicle; and
 a front recognition device configured to recognize right and left lane dividing lines in front and recognize a shape of a traveling road on which the vehicle is traveling, wherein
 the steering control processor is further configured to
 receive inputs of various types of vehicle information from the yaw rate sensor, the steering angle sensor, the wheel speed sensor, the acceleration sensor, the gyroscope sensor, and the front recognition device, and control the motor driver based on the various types of vehicle information, and
 detect the skid of the vehicle based on the various types of vehicle information and execute the slip-handling mode.

3. The vehicle lane keep control apparatus according to claim 2, wherein the steering control processor is configured to determine the skid of the vehicle when a relative-to-lane yaw angle of the vehicle is larger than a first threshold.

4. The vehicle lane keep control processor according to claim 3, wherein the steering control processor is configured to perform the steering control to allow the vehicle to have a stable attitude until the relative-to-lane yaw angle of the vehicle is equal to or less than a second threshold that is smaller than the first threshold.

5. The vehicle lane keep control processor according to claim 4, wherein the steering control processor is configured to perform the steering control using a second front gazing point that is located more distant from the vehicle in a traveling direction of the vehicle than a first front gazing point is during the lane keeping mode.

6. A vehicle lane keep control apparatus comprising circuitry configured to, upon detection of a skid of a vehicle during control that includes setting a target route on which the vehicle is to travel, calculating a control amount for an electric power steering motor of the vehicle based at least an amount of shifting from the target route, and causing the vehicle to travel along the target route, switch modes from a lane keeping mode to a slip-handling mode, perform a steering control to allow the vehicle to have a stable attitude, and restart the lane keeping mode.

\* \* \* \* \*